(No Model.)
F. D. GOULD.
TOOTH CLEANER.
No. 589,209.  Patented Aug. 31, 1897.
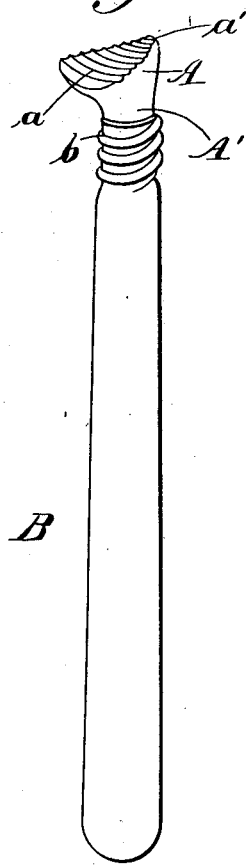
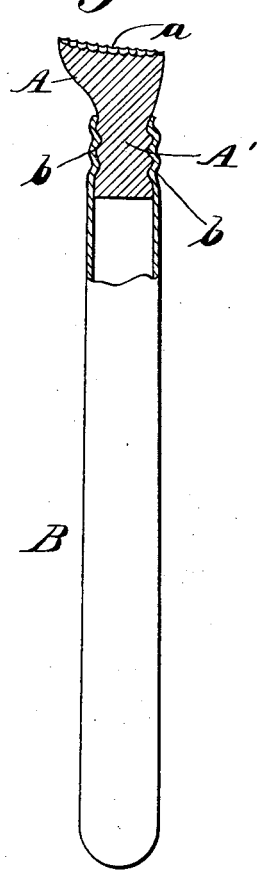
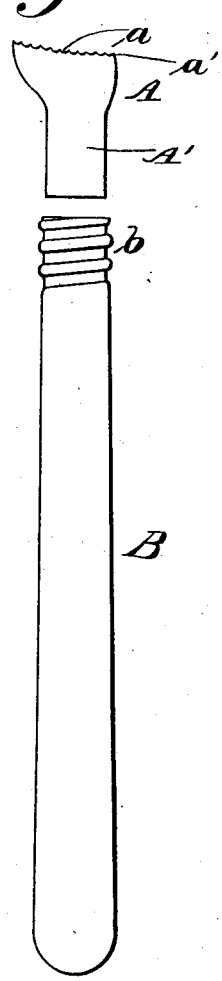
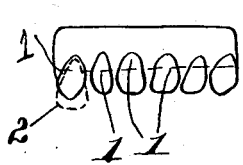
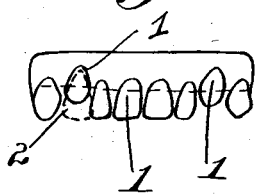
WITNESSES:
INVENTOR
F. D. Gould
BY
ATTORNEYS

United States Patent Office.

FRANK DOWNING GOULD, OF PORT RICHMOND, NEW YORK.

TOOTH-CLEANER.

SPECIFICATION forming part of Letters Patent No. 589,209, dated August 31, 1897.

Application filed June 5, 1897. Serial No. 639,516. (No model.)

*To all whom it may concern:*

Be it known that I, FRANK DOWNING GOULD, a citizen of the United States, and a resident of Port Richmond, county of Richmond, and State of New York, have invented certain new and useful Improvements in Tooth-Cleaners, of which the following is a specification, reference being had to the accompanying drawings, forming a part thereof, in which similar letters and figures of reference indicate corresponding parts.

This invention relates to improvements in tooth-cleaners; and the object thereof is to supply a device of this character adapted for thoroughly cleaning teeth of both regular and irregular contour without liability of injuring the gums of a user. By the use of this device the neck of each individual tooth up to the line of juncture with the gum can be constantly maintained in a perfectly clean condition, and accumulation of all deleterious deposits is prevented.

The device is simple in construction and inexpensive, and it can be successfully used by children or other inexperienced and unskilled persons.

The invention will be hereinafter fully described, and specifically set forth in the annexed claims.

In the accompanying drawings, forming part of this specification, Figure 1 is a perspective view of my improved cleaner. Fig. 2 is a side elevation thereof, partly in section. Fig. 3 is a side elevation of the cleaner, showing the several parts thereof disassembled; and Figs. 4, 5, and 6 are diagrams illustrating various arrangements of teeth adapted for being cleaned by my device.

In the practice of my invention the cleaner A is composed of rubber or other similar substance, and the face thereof is egg shape in contour or approximately the shape of the exposed portion of a tooth. This said face is concave, and it is supplied with a series of cross-ribs a. Extended outwardly from the cleaner A is a cylindrical projection A', this said projection being extended upon a line leading from the small end or point a' of the cleaner-face, whereby the said small point will not be bent back out of place when the device is in use.

To complete the device, a handle B is supplied. This said handle can be composed of metal or other suitable material, and it is supplied at the end thereof with a threaded socket b, adapted for engagement with the cylindrical projection A' of the cleaner. This said projection has a normal smooth surface, as illustrated in Fig. 3 of the drawings, but owing to the flexibility of the material from which it is formed it can be screwed into the socket b and maintained therein, as illustrated in Fig. 2 of the drawings, whereby it will not be susceptible of accidental removal or displacement, while at the same time it may be unscrewed or removed when it is worn out, whereby a new cleaner may be placed within the socket, and one handle will be sufficient for a considerable number of cleaners.

In the operation and use of the device the concave face of the cleaner is pressed into contact with the exposed portion 1 of the tooth, the point at the neck thereof, as illustrated by dotted lines 2 in diagrams 4 and 5 of the drawings. Movement in an alternately upward and downward direction is then imparted to the cleaner, whereby any deposit thereon is removed by the ribs on the face of the said cleaner. When the teeth are set irregular in plan, as shown by diagram 6, it is obvious that owing to the shape of the cleaner-face teeth 3, set to the rear, can be readily reached, as shown by dotted lines 4.

I do not confine mself to the specific means for attaching the cleaner to the handle, as it is obvious that under the scope of my invention I am entitled to slight structural variations.

Having thus described my invention, what I claim as new, and desire to secure by Letters Patent, is—

1. A tooth-cleaner, comprising a flexible body having a concave and ribbed face of approximately egg-shaped contour, and a projection extended approximately at right angles from the rear of said body, and a handle connected to said projection, substantially as shown and described.

2. In a tooth-cleaner, the combination of a flexible body having a concaved and ribbed face of approximately egg-shaped contour, and a cylindrical projection extended rearwardly therefrom, and a handle having a threaded socket in the end thereof engaging with the said projection, whereby the flexible body may be secured to the handle or removed therefrom at will, substantially as shown and described.

In testimony that I claim the foregoing as my invention I have signed my name, in the presence of two witnesses, this 3d day of June, 1897.

FRANK DOWNING GOULD.

Witnesses:
C. SEDGWICK,
B. McCOMB.